United States Patent [19]
Guetersloh

[11] 3,724,972
[45] Apr. 3, 1973

[54] FUEL INJECTION PUMP
[75] Inventor: Donald G. Guetersloh, Anderson, Ind.
[73] Assignee: General Motors Corporation, Detroit, Mich.
[22] Filed: Dec. 27, 1971
[21] Appl. No.: 211,934

[52] U.S. Cl. ............... 417/220, 417/307, 417/308, 417/310, 417/311, 418/31, 418/26
[51] Int. Cl. .......................................... F04b 49/08
[58] Field of Search ...... 417/220, 310, 307, 308, 311; 418/31, 26

[56] References Cited

UNITED STATES PATENTS 2,189,210  2/1940  Johnson ................. 417/311
3,238,884  3/1966  Wright .................. 417/220

Primary Examiner—Carlton R. Croyle
Assistant Examiner—Richard J. Sher
Attorney—J. L. Carpenter et al.

[57] ABSTRACT

A fuel injection pump is located in a distributor housing which also contains a magnetic pickup for controlling fuel injection, a magnetic pickup for controlling ignition, and other ignition system components. The fuel injection pump is a variable displacement vane pump and has an accumulator and pressure regulator unit which maintains the fuel supplied to the injection nozzles at a constant pressure.

7 Claims, 3 Drawing Figures

INVENTOR.
Donald G. Guetersloh
BY
C. K. Veenstra
ATTORNEY

INVENTOR.
Donald G. Guetersloh
BY
C. K. Veenstra
ATTORNEY

FUEL INJECTION PUMP

This invention relates to control of delivery of fuel from an injection pump to an injection nozzle.

In some speed-density fuel injection systems, fuel is metered by opening an injection nozzle shortly before each combustion event for a period of time determined by the absolute pressure in the air induction manifold. With these systems, it often is desired to maintain the pressure of the fuel supplied to the injection nozzle at a constant level so that fuel delivery is not affected by variations in fuel pressure. This invention provides an accumulator and pressure regulator unit which achieves that end.

Preferably, this pressure regulator and accumulator unit is associated with a variable displacement vane pump wherein the pump rotor and vanes are disposed in a slider and wherein the slider may be moved relative to the rotor axis to reduce pump displacement. The pressure regulator responds to excessive fuel pressure by opening a valve to bleed fuel from the pump outlet. The fuel so discharged may be utilized to move the slider and reduce the pump displacement, thereby avoiding pumping and recirculating excess fuel.

The accumulator and pressure regulator unit depicted herein includes a lost motion connection between a rolling diaphragm and the pressure relief valve so that a quantity of fuel is accumulated before excessive fuel pressure causes the diaphragm to open the pressure relief valve. Upon an increase in demand for fuel, there is a tendency for the fuel pressure to decrease. This causes the accumulator to discharge the accumulated fuel to the injection nozzles, thus minimizing the reduction in fuel pressure during the time the injection pump is returning to full delivery.

The details as well as other objects and advantages of this invention are set forth in the remainder of the specification and in the drawings in which.

Figure 1:
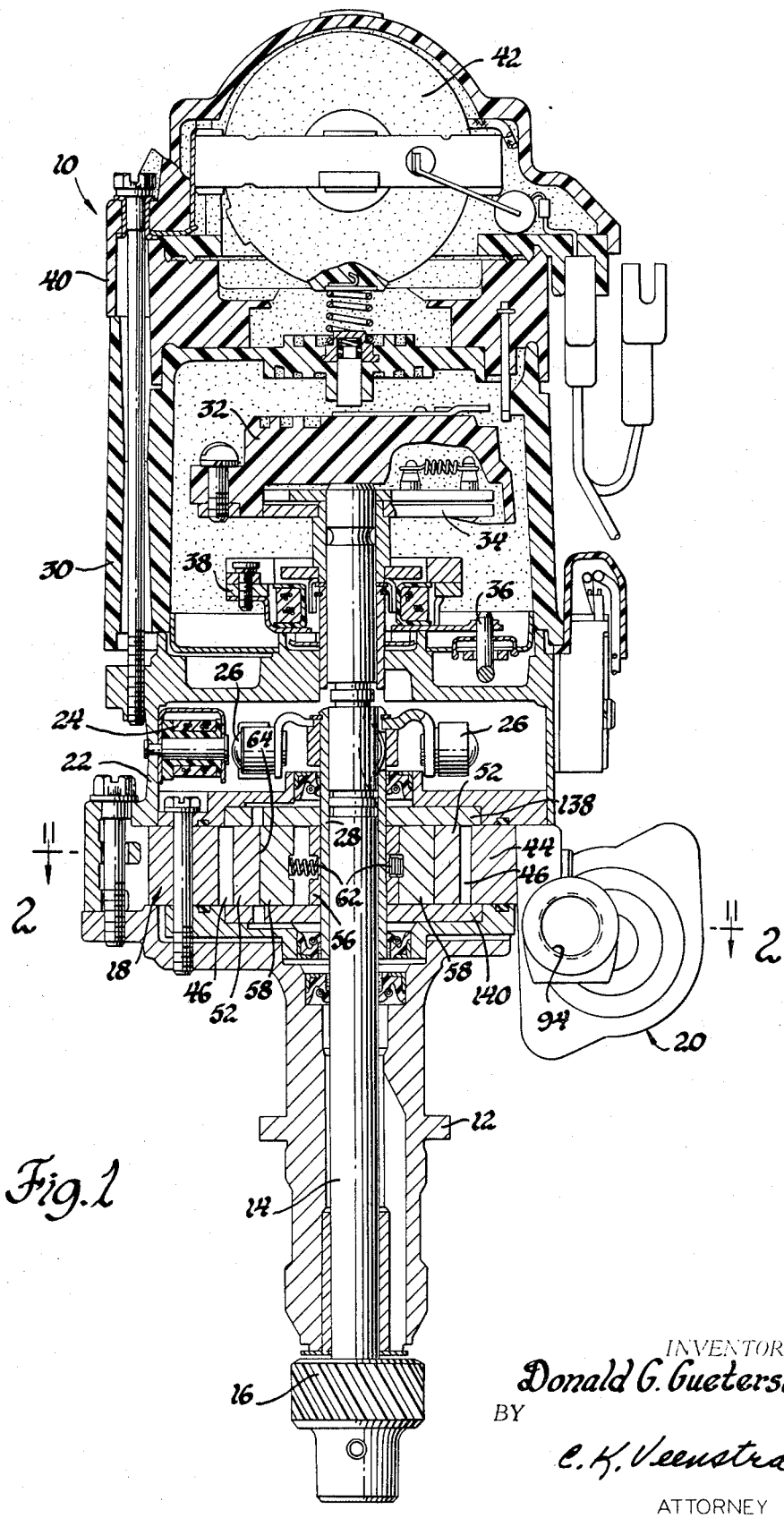
FIG. 1 is an elevational view, in section, of a distributor assembly incorporating the fuel injection pump and the accumulator and pressure regulator unit.

Referring first to FIG. 1, the distributor 10 has a base 12 adapted for mounting on an engine and a shaft 14 driven from the engine through a gear 16.

An injection pump assembly 18 is mounted on base 12, and an accumulator and pressure regulator unit 20 is secured to pump 18.

A housing 22, also mounted on base 12, contains a magnetic pickup coil 24. Associated with coil 24 are a plurality of magnets 26 mounted on a sleeve 28 keyed to shaft 14. Magnets 26 and coil 24 provide a timing signal for an electronically controlled fuel injection system as described in detail in U.S. Pat. No. 3,606,869.

An ignition distributor shell 30, mounted on housing 22, contains an ignition distributor rotor 32, a centrifugal advance mechanism 34, a vacuum advance mechanism 36 and a magnetic pickup assembly 38, all as shown and described in detail in U.S. Pat. No. 3,254,247.

A distributor cap 40, mounted on distributor shell 30, contains an ignition coil 42 as shown and described in detail in U.S. application Ser. No. 38,988 filed May 20, 1970, now U.S. Pat. No. 3,638,630.

Since the construction and operation of the magnetic pickup assemblies for the fuel injection and ignition systems and of the other ignition system components in distributor 10 are depicted in the indicated patents, those patents are incorporated herein by reference and further discussion of those items is omitted.

It should be noted that housing 22 may be rotatably adjusted with respect to distributor base 12 without moving fuel injection pump 18 and accumulator and pressure regulator 20. This permits positioning of the magnetic pickups for the fuel injection and ignition systems to adjust fuel injection and ignition timing without requiring movement of the fuel lines associated with pump 18 and accumulator and pressure regulator unit 20.

Figure 2:
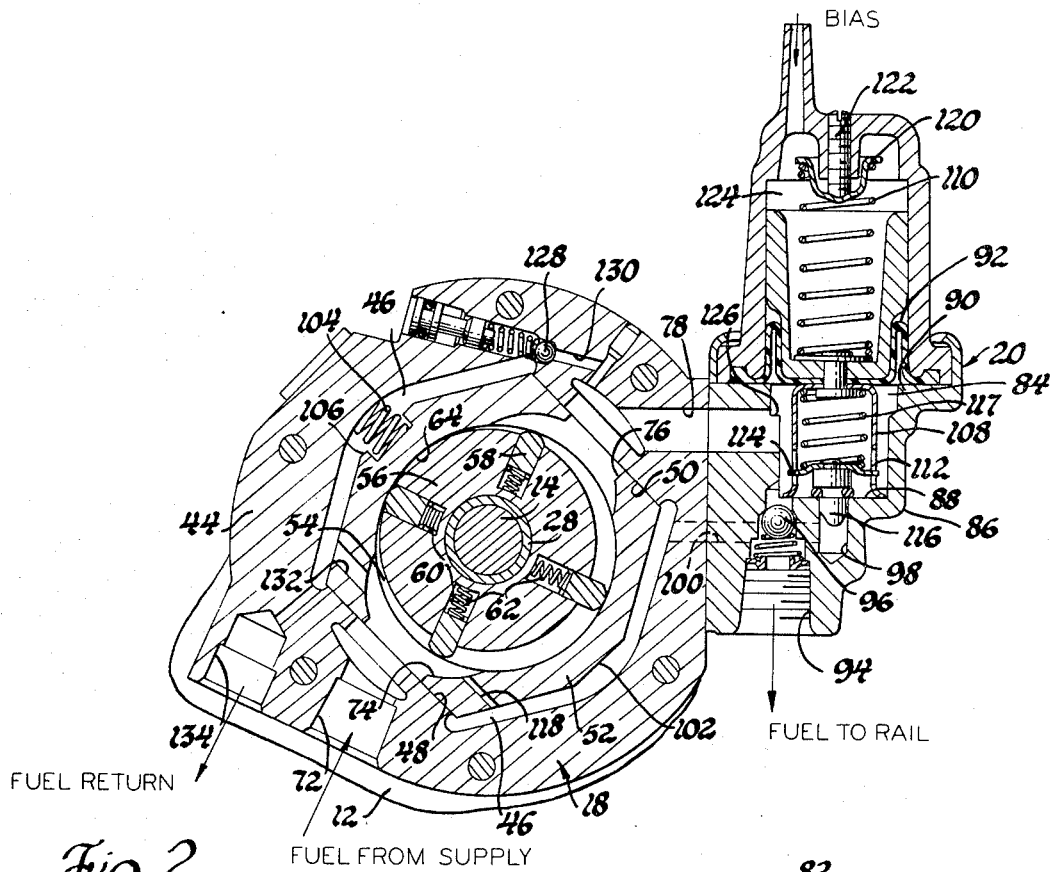
FIG. 2 is a sectional view along line 2—2 of FIG. 1 showing the injection pump and the accumulator and pressure regulator unit.

Referring now to FIG. 2, injection pump 18 has a housing 44 forming a cavity or chamber 46 which includes a pair of flat parallel surfaces 48 and 50.

A slider 52 is disposed within chamber 46 in sliding engagement with surfaces 48 and 50. Slider 52 includes a cylindrical pumping chamber 54.

A cylindrical rotor 56, pressed on sleeve 28 of shaft 14, is disposed in slider chamber 54. A plurality of vanes 58, disposed in slots 60 of rotor 56, are biased outwardly by springs 62 into engagement with the cylindrical wall 64 of slider chamber 54.

Figure 3:
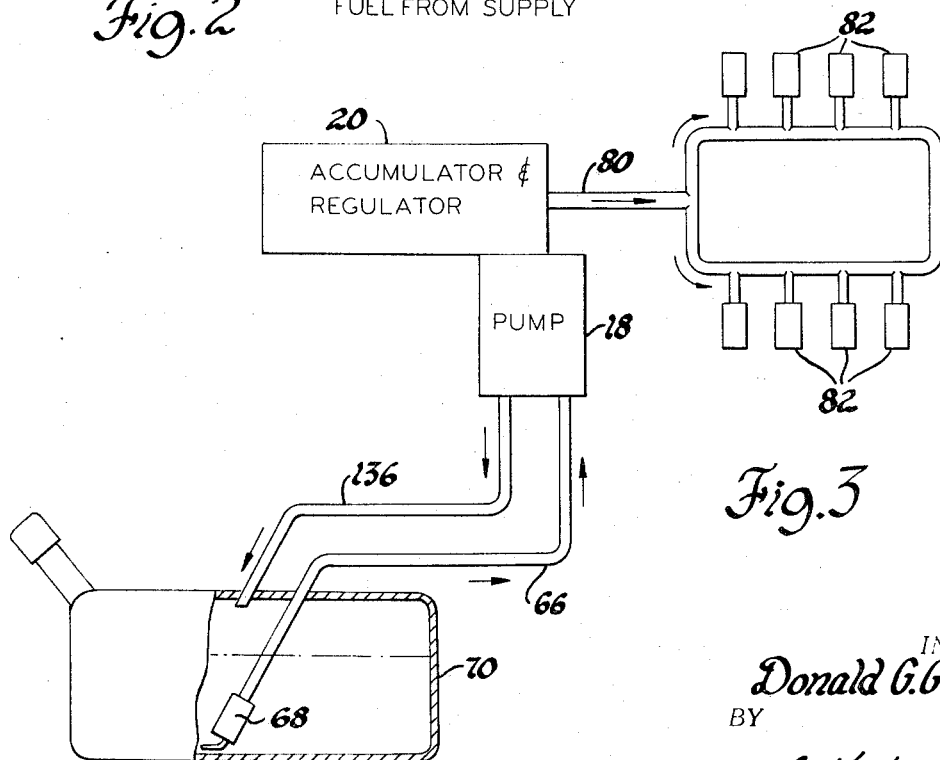
FIG. 3 is a schematic diagram of a fuel injection system incorporating the pump and the accumulator and pressure regulator of FIG. 2.

As shown in FIG. 3, a fuel line 66 delivers fuel to pump 18 from a supply pump 68 located in a fuel tank 70. Fuel is received from line 66 through an inlet 72 in housing 44 and an inlet 74 in slider 52. Upon counterclockwise rotation of shaft 14, sleeve 28, and rotor 56, fuel is delivered through pumping chamber 54, an outlet 76 in slider 52, and an outlet 78 in housing 44 to accumulator and pressure regulator unit 20.

As also shown in FIG. 3, fuel is delivered from accumulator and pressure regulator unit 20 through a fuel rail 80 to a plurality of injection nozzles 82. As shown in FIG. 2, fuel is received from pump outlet 78 in an accumulator chamber 84. Accumulator chamber 84 is defined by a housing 86 having a closed end wall 88 and an otherwise open end 90 closed by a pressure responsive rolling diaphragm 92. A fuel delivery outlet 94 is connected to fuel rail 80 and has a spring biased ball check valve 96 which prevents backflow from fuel rail 80 into accumulator chamber 84.

Accumulator chamber 84 also has a pressure relief outlet 98 opening from closed end 88. Pressure relief outlet 98 is connected by a passage 100 to stator chamber 46 at one end 102 of slider 52. A spring 104 acts against the other end 106 of slider 52 to bias slider 52 against the fuel pressure acting against slider end 102.

A bracket 108, secured to rolling diaphragm 92, engages the closed end 88 of accumulator chamber 84 to limit movement of rolling diaphragm 92 under the bias of spring 110. Bracket 108, which may be either cupped or bifurcated, has a plurality of slots 112 which receive tangs 114 extending radially from a pressure relief valve member 116.

In operation, diaphragm 92 moves toward the top of FIG. 2 as the fuel pressure increases in accumulator chamber 84. Fuel is accumulated in chamber 84 until pressure relief valve tangs 114 are engaged by the ends of bracket slots 112. The accumulating stroke of diaphragm 92 is determined by the lost motion distance provided in slots 112. Movement of diaphragm 92 in excess of that distance causes disengagement of pressure relief valve 116 from pressure relief outlet 98, permitting excess fuel in accumulator chamber 84 to be discharged through outlet 98.

If desired, fuel discharged through pressure relief outlet 98 may be returned to fuel pump inlet 72 or fuel tank 70. Preferably, however, fuel discharged through pressure relief outlet 98 is delivered through passage 100 to stator chamber 46 and acts on end 102 of slider 52. This displaces slider 52 against the bias of spring 104 to reduce the eccentricity between pumping chamber wall 64 and pump rotor 56. The delivery of injection pump 18 is thereby reduced to maintain the fuel pressure in accumulator 84, outlet 94, and fuel rail 80 at a constant value.

As injection nozzles 82 deliver an increased amount of fuel, the fuel pressure in fuel rail 80, outlet 94, and accumulator chamber 84 will tend to decrease. In response, diaphragm 92 is moved toward the bottom of FIG. 2 by spring 110, and the accumulated fuel in chamber 84 is delivered though outlet 94 past check valve 96 to fuel rail 80. At the same time, a spring 117 causes pressure relief valve 116 to engage pressure relief outlet 98, and the fuel pressure against slider end 102 is dissipated through a restricted passage 118 in slider 52 to pumping chamber inlet 74. Slider 52 then is returned by spring 104, and the displacement of pump 18 is increased to supply the increased fuel delivered by nozzles 82.

If desired, rolling diaphragm spring 110 may be received on a seat 120 which is positioned by an adjustment 122 to control the preload of spring 110 and thus to control the pressure range in which accumulator and pressure regulator unit 20 is effective.

On the opposite side of diaphragm 92 from accumulator chamber 84 is a bias pressure chamber 124. Bias pressure chamber 124 may be maintained at atmospheric pressure if desired. Preferably, however, a bias pressure is applied to chamber 124 which is the same in value as the pressure ambient the outlet of injection nozzles 82. If injection nozzles 82 discharge into an air induction manifold, then manifold pressure would be applied to bias pressure chamber 124. And if injection nozzles 82 discharge into an air gallery leading to an induction air manifold, then air gallery pressure would be applied to bias pressure chamber 124. By this means, the pressure differential across injection nozzles 82 is also applied across diaphragm 92 and the pressure differential across injection nozzles 82 is thereby maintained constant.

It will be noted that bracket 108 serves both to limit movement of diaphragm 92, by engaging end wall 88, and to operate pressure relief valve 116. It will be appreciated, however, that these functions may be separated into two subassemblies. For example, the stop function of bracket 108 could be achieved by having a portion engage the ledge 126; ledge 126 may be considered as a portion of end wall 88 for this purpose.

In one application, accumulator and pressure regulator 20 is designed to maintain the pressure in fuel rail 80 at a level of 65 psi. In the event pressure in outlet 76–78 should rise substantially above this level, a spring biased ball check valve 128, disposed in pump housing 44, opens to discharge fuel from outlet 78 through a passage 130. This fuel may be discharged past the end 106 of slider 52 and returned to the pump inlet 74 through an unrestricted passage 132 in slider 52. If desired, fuel so bypassed also may be returned through an outlet 134 in housing 44 and a return line 136 to fuel tank 70.

As shown in FIG. 1, pump 18 is provided with top and bottom plates 138 and 140 which form end walls for pumping chamber 54. Slider 52 and vanes 58 are formed of carbon while rotor 56 and top and bottom plates 138 and 140 are formed of sintered iron. These materials have been selected to permit efficient, durable pump operation.

I claim:

1. In a fuel injection system having a pump for delivering fuel to an injection nozzle, an accumulator and pressure regulator for controlling delivery of fuel from said pump to said nozzle and comprising a housing defining a chamber for receiving fuel from said pump and having an open end and a closed end, said housing further defining a fuel delivery outlet extending from said chamber for delivering fuel to said nozzle and a pressure relief outlet extending from said closed end of said chamber for discharging excess fuel received from said pump, a rolling diaphragm closing said open end of said chamber and movable away from said closed end of said chamber in response to an increase in fuel pressure within said chamber, means biasing said diaphragm toward said closed end of said chamber, a bracket secured to said diaphragm within said chamber and engageable with said closed end of said chamber for limiting movement of said diaphragm theretoward, a valve member disposed in said chamber and engageable with said pressure relief outlet for controlling flow therethrough, means biasing said valve member away from said diaphragm toward engagement with said pressure relief outlet, said valve member including means engageable with said bracket after said diaphragm and said bracket move a selected distance away from said closed end of said chamber to thereby disengage said valve member from said pressure relief outlet, whereby initial displacement of said diaphragm less than said selected distance in response to an increase in fuel pressure within said chamber increases the amount of fuel accumulated in said chamber, whereby additional displacement of said diaphragm greater than said selected distance in response to an increase in fuel pressure within said chamber effects disengagement of said valve member from said pressure relief outlet to prevent further increase in pressure within said chamber, and whereby return of said diaphragm toward said closed end of said chamber upon a decrease in fuel pressure within said chamber discharges the increased amount of fuel accumulated within said chamber through said fuel delivery outlet for delivery to said nozzle.

2. The accumulator and pressure regulator of claim 1 wherein said bracket has a plurality of slots and said valve member has projections received in said slots whereby said valve member may be engaged by said bracket after said diaphragm and said bracket move said selected distance.

3. The accumulator and pressure regulator of claim 1 which further comprises means for applying a bias pressure against said diaphragm in opposition to the fuel pressure.

4. In a fuel injection system, a pump for delivering fuel to an injection nozzle comprising a stator defining a stator chamber,
a cylindrical rotor disposed within said stator chamber,
a slider reciprocably disposed within said stator chamber and having a cylindrical pumping chamber receiving said rotor, said slider further having a fuel inlet for supplying fuel to said pumping chamber and a fuel outlet for discharging fuel from said pumping chamber, said slider being responsive to an increase in fuel pressure in said stator chamber to move from a pumping position wherein the axis of said pumping chamber is eccentric the axis of said rotor toward a neutral position wherein the axis of said pumping chamber is coincident the axis of said rotor,
means biasing said slider toward said pumping position,
a plurality of vanes extending radially from said rotor into engagement with said slider,
an accumulator and pressure regulator having an accumulator chamber connected to said slider fuel outlet for receiving fuel from said pumping chamber, said accumulator chamber having an open end, a closed end, a fuel delivery outlet for delivering fuel to said nozzle and a pressure relief outlet extending to said stator chamber at one end of said slider,
a rolling diaphragm closing said open end of said accumulator chamber and movable away from said closed end upon an increase in fuel pressure within said accumulator chamber,
means biasing said diaphragm toward said closed end of said accumulator chamber,
a bracket secured to said diaphragm in said accumulator chamber and engageable with said closed end of said chamber for limiting movement of said diaphragm theretoward,
a valve member disposed in said accumulator chamber and engageable with said pressure relief outlet for controlling flow from said accumulator chamber to said stator chamber,
means biasing said valve member away from said diaphragm toward engagement with said pressure relief outlet,
said valve member including means engageable with said bracket after said diaphragm and said bracket move a selected distance away from said closed end of said accumulator chamber to thereby disengage said valve member from said pressure relief outlet,
whereby rotation of said rotor within said pumping chamber when said slider is in said pumping position may effect delivery of fuel from said slider fuel inlet, through said pumping chamber, said slider fuel outlet, said accumulator chamber, and said fuel delivery outlet to said nozzle,
whereby initial displacement of said diaphragm less than said selected distance in response to an increase in fuel pressure within said accumulator chamber increases the amount of fuel accumulated in said accumulator chamber,
whereby additional displacement of said diaphragm greater than said selected distance in response to an increase in fuel pressure within said chamber effects disengagement of said valve member from said pressure relief outlet and fuel is discharged from said accumulator chamber through said pressure relief outlet to said stator chamber to displace said slider toward said neutral position and thereby reduce fuel delivery from said pumping chamber,
and whereby return of said diaphragm toward said closed end of said chamber upon a decrease in fuel pressure within said accumulator chamber discharges the increased amount of fuel accumulated within said accumulator chamber through said fuel delivery outlet for delivery to said nozzle.

5. The pump of claim 4 wherein said one end of said slider has an opening from said stator chamber to said slider fuel inlet to permit reduction of pressure in said stator chamber and thereby facilitate return of said slider to said pumping position under the bias of said slider biasing means.

6. The pump of claim 4 wherein said stator includes a pressure relief passage extending from said slider fuel outlet to said stator chamber at the opposite end of said slider, and which further comprises a pressure responsive valve in said passage which permits fuel flow therethrough only when the pressure in said fuel outlet exceeds a selected value, whereby excess pressure in said fuel outlet may be relieved.

7. The pump of claim 6 wherein said opposite end of said slider has an opening from said stator chamber to said slider fuel inlet to allow fuel discharged past said pressure responsive valve to flow freely to said fuel inlet.

* * * * *